United States Patent

Merrill et al.

[15] 3,673,612

[45] July 4, 1972

[54] NON-THROMBOGENIC MATERIALS AND METHODS FOR THEIR PREPARATION

[72] Inventors: Edward W. Merrill; Patrick Seck-Lai Wong, both of Cambridge, Mass.

[73] Assignee: Massachusetts Institute of Technology, Cambridge, Mass.

[22] Filed: Aug. 28, 1970

[21] Appl. No.: 67,969

Related U.S. Application Data

[63] Continuation-in-part of Ser. No. 745,400, July 17, 1968, abandoned, Continuation-in-part of Ser. No. 747,789, July 26, 1968, abandoned.

[52] U.S. Cl. .................................3/1, 23/258.5, 117/145, 128/214, 128/349, 161/182, 161/188, 210/22, 210/321, 260/9, 260/17 A, 260/17 R, 424/16, 424/82, 424/183
[51] Int. Cl. ................A61f 1/00, A61m 25/00, A61k 17/18
[58] Field of Search ..........................3/1; 23/258.5; 117/145; 128/214, 349; 161/182, 188; 210/22, 321; 260/9, 17 A, 17 R; 424/16, 82, 183

[56] References Cited

UNITED STATES PATENTS 3,549,409  12/1970  Dyck ........................................117/47
3,522,346  7/1970   Chang......................................424/35

*Primary Examiner*—Shep K. Rose
*Attorney*—Thomas Cooch, Martin M. Santa and Richard F. Benway

[57] ABSTRACT

Non-thrombogenic materials prepared by reacting a heparin-type anticoagulant, hydroxyl, or combinations of hydroxyl and acetal groups that are part of already synthesized macromolecules having an atomic carbon-to-oxygen ratio in excess of unity, an aldehyde and an acid catalyst. The non-thrombogenic materials can be used for implanted and extracorporeal biomedical devices and prostheses intended to be used in direct contact with blood, including tubes, valves, membrane assemblies for blood dialysis and oxygenation, anesthesia-carrying tubes, etc.

64 Claims, No Drawings

NON-THROMBOGENIC MATERIALS AND METHODS FOR THEIR PREPARATION

This application is a continuation-in-part of applications, Ser. No. 745,400 filed July 17, 1968 and Ser. No. 747,789 filed July 26, 1968 both now abandoned.

This invention relates to non-thrombogenic polymer compositions containing permanently bound heparin, that are particularly useful in implanted and extracorporeal biomedical devices and prostheses for use in direct contact with blood.

Numerous materials have been evaluated for biomedical application and have been found to exhibit varying degrees of compatibility with mammalian blood. Membranes and solid polymeric surfaces containing hydroxyl groups which have been evaluated include hydrogels, regenerated cellulose, cross-linked polyvinyl alcohol, partially hydrolyzed cellulose esters and poly (glycerol methacrylate) and cellulose as cellophane which presently is the most widely used membrane material for dialysis of blood. Irrespective of the source or nature of hydroxyl-containing membranes and surfaces, they are all "contact activating" with respect to the intrinsic clotting system of blood. For example, hydrogels not containing an anticoagulant invariably cause blood clotting in considerably less than half an hour. Thus, it is necessary to anticoagulate blood with heparin, citrate, or other anticoagulants prior to contact, otherwise the blood, drawn from the living circulation will clot within a few minutes after contact.

It is well-known that the anticoagulant heparin, a polysaccharide of approximate molecular weight 12,000 –16,000 carrying sulfate and amine-sulfate groups, can be bound to a variety of positively charged membranes and surfaces via ionic bonding. Substances containing primary, secondary, tertiary, and quarternary ammonium groups, such as ion-exchange resins, aminoethyl cellulose, cross-linked polyvinyl benzyl trimethyl ammonium chloride, etc., all bind heparin to varying degrees depending upon the density of the surface charge and other factors relevant to the detailed molecular structure of the surface.

Since many otherwise useful polymers, such as cellophane, cellulose acetate and cross-linked polyvinyl alcohol, lack any positively charged groups with which to bind heparin, they must be chemically modified such as by amination. Chemical modification in general is undesirable since it leads to lower strength, easier abrasion, and added preparation expense. While such positively charged surfaces readily absorb heparin, upon subsequent contact with blood or blood plasma, some of the heparin is released into the plasma, presumably by ion exchange, and after sufficiently long, e.g., days or weeks, contact with plasma, and heparinized surfaces often appear to become thrombo-genic.

Materials with low surface free energy including silicones, polytetrafluoroethylene, lipid monolayers, etc., have been investigated actively in a search for a non-thrombogenic material. While they significantly delay blood clotting as compared with glass and other active surfaces, they are thrombogenic and therefore limited to medical engineering applications, either intra- or extracorporeal, in which the blood flow is sufficiently high to prevent clotting via the contact-activation (intrinsic) process.

The present invention provides a non-thrombogenic composition and its method of preparation. The composition comprises the reaction product of heparin, a polymeric material containing hydroxyl groups, or hydroxyl and acetal groups, and an aldehyde, prepared with an acid catalyst. The reaction product comprises heparin covalently bonded to the solid polymeric material and is insoluble in water.

The procedure for producing the composition of this invention depends upon whether the reaction is to be carried out as a single-phase homogeneous reaction or as a heterogeneous reaction. This in turn depends on whether the polymeric material is initially in co-solution with the other reagents, or whether, owing to prior network formation, to microcrystallization, or to other secondary valence forces, it is in a non-soluble, gelled, or rubbery state. In either embodiment, sodium heparin or the various heparinoids, all of which are characterized by a high sulfate and amine sulfate content, may be used. The preferred heparin is sodium heparin with an activity exceeding 100,000 U.S.P. units/gram. Any strong water-soluble acid may be used as a catalyst at a normality of approximately 0.005 to 1.0 such as sulfuric, hydrochloric, phosphoric, or acetic acid, with sulfuric acid being preferred. Suitable monoaldehyde reactants include formaldehyde, acetaldehyde, and butyraldehyde, with formaldehyde being preferred. Suitable dialdehyde reactants include glyoxal and glutaraldehyde, the latter being preferred.

In the homogeneous reactions during the course of reaction of a monoaldehyde and/or a dialdehyde in an acidic medium in the presence of a heparin-type anticoagulant and hydroxyl, or hydroxyl and acetal groups of a polymer, it is believed that the heparin becomes bonded to the polymer through acetal and perhaps some hemiacetal bridges. When employing a dialdehyde, aldehyde and acid concentrations are lower than when employing a monoaldehyde so that the degree of cross-linking and gelation can be more easily controlled. When gelation proceeds too rapidly, the resultant product is too highly cross-linked and can be easily shattered. The dialdehyde concentration is between 0.001 and 1 mole dialdehyde per mole of hydroxyl, or hydroxyl plus acetal, mer units and acid concentration is maintained between 0.005N and 0.2N. The monoaldehyde reactant concentration is between 0.1 and 5 moles monoaldehyde per mole hydroxyl or hydroxyl plus acetal and the acid concentration is maintained between 0.1N and 0.5N. When a reactant mixture of monoaldehyde and dialdehyde is used, the concentration of the mixture and the acid normality used will be intermediate between the ranges set forth above for either monoaldehyde or dialdehyde separately, and will be dependent upon the relative concentration of each aldehyde. The heparin-type anticoagulant is employed in concentrations to effect substantially uniform bonding to the polymer surface and to render the surface non-thrombogenic. Generally, the heparin is employed in concentrations between 0.5 and 5.0 weight percent based upon the final solution. Reaction temperature is regulated between about 60° and 90° C. to obtain reaction times of from 20 minutes to 12 hours.

Suitable soluble polymers include poly (vinyl alcohol), copolymers of vinyl alcohol and vinyl acetate, poly (vinyl alcohol co-acetate-co-acetal), methyl cellulose, carboxy methyl cellulose, or the like.

For convenience, a preferred process of this invention, wherein a hydrogel is formed from a hydroxyl-containing polymer initially in solution, is described with reference to a copolymer of polyvinyl alcohol and polyvinyl acetate. Commercial polyvinyl alcohol having an average molecular weight between 5,000 and 120,000 a polyvinyl acetate content of from zero to 10 weight percent and containing no antioxidant or stabilizer, is preferred. Any foreign matter should be removed either by centrifugation or filtration of the polymer solution. For convenience of subsequent mixing and casting, the final polymer concentration in the mixture can be between 5 and 25 percent by weight. The concentration of reagent grade formaldehyde should be between 3 and 10 weight percent, of sodium heparin between 0.1 and 1.5 weight percent, and sulfuric acid concentration of 0.07 to 0.4N or hydrochloric acid 0.04 to 0.1N. The final mixture is heated at temperatures between 60° and 90° C. for 20 minutes to 12 hours. When glutaraldehyde is used without any monoaldehyde, its preferred concentration is between 0.02 and 7 percent, and the acid concentration must be significantly reduced to between 0.005N and 0.05N. Otherwise gelation will proceed too rapidly, and the resulting product will be too highly cross-linked and fragile.

The heparin-bonded hydrogels obtained from homogeneous reactions, if not allowed to dry out, are characterized by their ability to hold, by osmotic swelling, very large quantities of water, up to 100 parts per 1 part of polymer, while retaining a network structure to prevent their going into solution. When monoaldehydes are used exclusively, and the extent of reaction is low (e.g., lower temperature, shorter times), the ultimate hydrogel is opaque at 37° C. and becomes increasingly transparent upon being cooled in saline (0.15M) to 0° C. It swells greatly, increasing in volume up to five fold as it is cooled from 37° to 0° C. and the swelling is reversible. The hydrogels thus prepared from monoaldehydes are exceptionally extensible with ten-fold elongation without tear being easily achieved. After extension they recover completely, but slowly, their original dimension, suggesting a viscoelastic process characterized by high internal viscous damping. More drastic reaction conditions, e.g., higher acid concentration, higher temperature, and longer time, lead to hydrogels that are significantly less affected in swelling properties by temperature, and indeed have a lower water content and decreasing wettability of their surfaces.

Depending upon reaction time, aldehyde content, acid normality, temperature, the hydrogels prepared from monoaldehydes range from gross porosity such that red cells and other formed elements of blood can invade the gel to molecularly "tight" gels, obtained by drying and reswelling the highly reacted hydrogel, capable of excluding most plasma proteins while transporting micromolecular compounds.

In contrast, hydrogels prepared in a homogeneous reaction from a dialdehyde, such as glutaraldehyde, are distinctively different in the following respects:

a. They are perfectly or nearly completely transparent;
b. They do not significantly swell or shrink when heated or cooled in saline over the range 50° to 0° C;
c. They are limited in extensibility, behaving more like an ideal vulcanized rubber with low viscous damping and with characteristic "quick" snap-back after extension;
d. The gel is sufficiently tightly cross-linked as to exclude all formed elements of blood, and under most conditions to exclude plasma proteins.

When bonding the heparin to a solid polymer rather than a polymer dissolved in water, the reaction is carried out in the presence of an acid solution so that the hydroxyl or hydroxyl plus acetal groups on the portion of the polymer to be reacted contain at least 50 weight percent water when in equilibrium with surrounding water or dilute saline solution at temperatures between 0° and 50° C. Reaction of the heparin-type anticoagulant, monoaldehyde, and/or a dialdehyde also is effected in an acid medium so that the product comprises a heparin covalently bonded to the polymer. It is believed that this bonding also is effected through an acetal and/or hemiacetal bridge.

The acid concentration is maintained between 0.005N and 0.15N, when dialdehydes are used exclusively. The dialdehyde concentration in the solution phase is 0.03 weight percent to 5 weight percent. When monoaldehydes are used exclusively, their concentration is from 1 weight percent to 15 weight percent and the acid concentration is maintained between 0.05N and 0.3N. When a reactant mixture of monoaldehyde and dialdehyde is used, the concentration of the mixture and the acid normality used will be intermediate between the ranges set forth above and is dependent upon the relative concentration of each aldehyde. The heparin-type anticoagulant is employed in concentration to effect substantially uniform bonding to the polymer surface and to render the surface non-thrombogenic. Generally, the heparin is employed in concentrations between 1 and 5 weight percent based upon the final solution.

Suitable solid polymer materials containing hydroxyl, or combinations of hydroxyl and acetal groups, are those which do not dissolve when exposed to water. Insolubility may be the result of (a) crystallization, (e.g., cellulose), of (b) cohesion characteristics of the glassy state, (e.g., partially saponified cellulose), (c) three-dimensional molecular network formation as produced by free-radical polymerization of glyceryl methacrylate or by chemical cross-linking of linear, hydroxyl-carrying water soluble polymers. Cellulosic materials include cellophane in any form, cellulose acetate, cellulose acetate-butyrate, and cellulose propionate-butyrate. It will be understood that the surface of said cellulose acetate, cellulose acetate-butyrate, and cellulose propionate-butyrate is subject to a previous saponifying procedure if the hydroxyl content of the original material is insufficient to effect covalent bonding of heparin. Saponification can be effected conveniently by maintaining the polymer in a 5 percent NaOH solution at 60° C. for approximately 24 hours. The preferred solid polymer is a network polymer or hydrogel previously synthesized from polyvinyl alcohol and its copolymers with vinyl acetate such as polyvinyl alcohol co-acetate.

In the reactive solution in which the solid polymer is soaked, then heated, the preferred concentration of heparin is about 4 weight percent, of aldehyde such as glutaraldehyde, 0.02 to 4 weight percent, and sufficient sulfuric acid to yield a normality of between 0.015N to 0.15N. The preferred reaction temperature range is 60° to 90° C. and the preferred reaction time is 40 minutes to 3 hours.

Material produced from the solid polymeric starting material by this procedure has no significant difference in mechanical or structural properties relative to the control materials from which heparin is omitted.

The compositions of this invention, whether obtained by homogeneous or heterogeneous reaction, contain permanently bound heparin and permit long storage of human blood without the use of anticoagulants. No prior contact with blood plasma proteins is necessary to render the compositions of this invention non-thrombogenic. These compositions may be readily formed into a wide variety of shapes such as membranes, tubes, rods, valves, sponge-like material, and slabs with adjacent but non-communicating micro-channels particularly useful for blood dialysis and for blood oxygenation. In contrast to materials of the prior art, these materials may be quickly freed of excess heparin used in their synthesis within about 48 hours and the materials can by synthesized so that they have exceptional tear resistance, very high rates of water filtration, complete retention of plasma proteins, and numerous other properties of basic necessity in various biomedical applications.

Remarkably enough in the present invention, we have found that some heparin remains potent as an anticoagulant even after synthesis in the presence of dilute sulfuric, hydrochloric, or other acids under our preferred conditions. It is also found that heparin decreases the rate of cross-linking of polyvinyl alcohol, suggesting direct involvement in the kinetics of acetal bridge formation. After completion of the reactions cited above, a significant amount of heparin is bound to the substrate in such a way that it cannot be eluted by strong salt (3 molar) solution, indefinite washing, washing under pressure, or other forceful means whereby molecularly entrapped or ionically bound heparin can be removed. For example, 3 molar sodium chloride solution will quantitatively remove more than 91 percent of heparin bound to any amine ion-exchange substrate within sixty minutes under standard conditions of flow, and ultimately will remove all heparin. The heparin content of our non-thrombogenic materials can be well demonstrated by either the use of $S^{35}$-labelled heparin followed by scintillation counting of the radioisotopes, or by the reaction characteristic of toluidine blue, which in the presence of heparin in pure water produces a brilliantly violet complex. By either the counting of $S^{35}$ or by examination of toluidine blue-stained hydrogels, or polymers, we have ascertained that the content of heparin remains constant after approximately twelve to 24 hours of washing and no further physical or chemical procedures short of total destruction, as for example by prolonged exposure to strong acid, oxidizing agent, etc., will remove the heparin. Further, toluidine blue stain and $S^{35}$-labelled heparin are found to be uniform throughout the hydrogels produced by homogeneous reaction indicating uniform concentration of heparin.

While the compositions described above are non-thrombogenic and therefore useful in medical appliances designed for contact with human blood, their use is relatively limited to special applications. For example, while the F-gels produced from homogeneous mixtures of heparin, polyvinyl alcohol, and formaldehyde are remarkably tough and tear resistant, if they are reacted for a sufficient time at a sufficiently high temperature, a fraction of the heparin used appears to become inactivated, thereby rendering the process relatively uneconomical with respect to the use of heparin.

In contradistinction to the gels made from polyvinyl alcohol and monoaldehydes, such as formaldehye("F-gels"), the gels made from polyvinyl alcohol and dialdehydes such as glutaraldehyde ("G-gels") are made with very low acid concentrations and are more economical with respect to the use of the heparin. These gels are relatively fragile. Though containing 90 percent or more water, when stressed beyond a certain value they shatter rather than tear. Various medical uses for them still exist, especially in situations where adequate time and precautions may be used to adapt them into a configuration in which they will be used without stress.

Similarly, there are some disadvantages involved with the use of the solid cellulosic polymers, e.g., cellophane and cellulose esters. Commercial cellophane, when made as dialysis tubing, consists of a grossly porous core material sandwiched between two thin-skin surfaces which have local imperfections. The problem with cellophane when treated by the process described above, or in fact by any other process such as sulfation, is that the skin layers tend to separate or open during and after reaction, thereby permitting the exposure of non-heparinized material to blood at a subsequent time. Furthermore, the cellulose esters, useful as hard, rigid materials such as cellulose acetate-butyrate, present an even greater difficulty in that in their original form they are unreactive and must undergo surface hydrolysis to create hydroxyl groups to permit heparin bonding. We have found that it is particularly difficult uniformly to hydrolyze the surface of cellulose ester pieces thereby to obtain uniform heparin bonding, and that the rate of hydrolysis varies with respect to area under identical reaction conditions, as a function of previous history of the polymer, e.g., the extent of orientation produced in it during extrusion, the plasticizer content, etc.

It is preferred to employ the process described below to prepare certain compositions of this invention. The composition so prepared can be used in applications as widely different as ultrafiltration membranes for blood dialysis or oxygenation and for intravenous "lifeline" catheters to provide long-term nutrition to patients by direct injection into the vena cava below the right heart.

The preferred process comprises preparing a multi-layer composition wherein only a relatively thin surface portion contains heparin bonded to the substrate. The substrate comprises or includes a cross-linked hydrogel formed from polyvinyl alcohol or vinyl alcohol-acetate copolymers. This substrate is prepared by reacting the soluble polymer with a monoaldehyde in acid in the manner described above but in the absence of heparin. A fluid surface layer containing heparin is then coated on and bonded to the substrate layer. The composition employed to form the surface layer comprises an aldehyde, a heparin-type anticoagulant, and an acid catalyst that is reacted to effect cross-linking in the manner described above. The surface layer may also contain soluble polymer which possesses hydroxyl groups. The acetal-hemiacetal-hydroxyl equilibrium on the substrate layer is reestablished to convert the previously formed acetal bonds thereon to secondary hydroxyl groups. This can be effected coincident with applying the surface composition by controlling the acid concentration therein and/or by contacting the substrate with water and/or acid prior to applying the coating. After this equilibrium is reestablished and the surface coating applied, the reaction proceeds to effect bonding of the heparin and soluble polymer, if any, in the surface layer through acetal or hemiacetal bonds to the substrate layer.

After reaction is complete, the composition is washed to remove excess reactants and acid. The acid concentration in the surface layer is maintained between 0.05N and 0.5N, preferably between 0.1N and 0.2N, to effect the desired reaction without degrading a large fraction of the heparin. While operating within the preferred acid concentration range, the desired heparin bonding to the substrate is attained within a short period.

The mechanical properties of the substrate material desired are obtained by regulating the conditions leading to acetal formation from aldehyde and/or by regulating the water content of the substrate prior to reaction with the heparin-containing surface layer. Stiffness is increased by increasing the degree of cross-linking and/or by removing water from the substrate prior to reaction with the surface composition. Thus, the degree of water removal during formation of the substrate material is controlled in accordance with the mechanical properties desired in the final product. When the substrate material is dried to less than about 30 weight percent water, more severe conditions may be needed to reestablish secondary hydroxyl groups on its surface accessible to reaction. In this instance, the dried substrate material may be immersed in an acid solution, e.g., 4.0N sulfuric acid or water, prior to coating the substrate with the heparin composition to effect heparin bonding.

The preferred multi-layer compositions provide substantial advantages. They can be made without homogeneously mixing heparin in the reaction mixture and with different degrees of drying to reduce the porosity in materials made from hydrogels and monoaldehydes. They can be prepared so that heparin is uniformaly distributed over the blood-contacting surface. Furthermore, they can be prepared over a wide range of conditions in accordance with the mechanical properties desired. They conserve heparin and thereby reduce raw material cost.

In one aspect of this invention, when preparing a multi-layer composition, a heparin-containing layer with dissolved polyvinyl alcohol is exposed to dialdehyde vapors, but only after a substantial portion of the polyvinyl alcohol in the surface layer has reacted with co-dissolved monoaldehyde, to avoid obtaining a brittle product. For example, the initial reaction is allowed to proceed 15 minutes before dialdehyde vapor is introduced. Then another 30 minutes or so is allowed to complete the reaction in the presence of dialdehyde vapor.

In another aspect of this invention, the substrate is formed by creating the network polymer system out of the initially homogeneous solution around any reinforcing material including woven or non-woven porous structures that can be permeated by the initially homogeneous reactive solution prior to cross-linking.

All the compositions of this invention, when fashioned into a vessel for the in vitro incubation at 37° C. of human blood freshly drawn by venipuncture by the Lee-White procedure, are non-thrombogenic as deduced by the following conditions that, taken together, are necessary and sufficient:

a. Control aliquots of blood incubated in glass tubes shall clot in less than 7 minutes and greater than 3 minutes; incubated in siliconized glass tubes shall clot in not less than 12 minutes.
b. Aliquots of blood placed in said material used as a comparable vessel at 37° C. shall not clot prior to 50 minutes.
c. Aliquots of blood removed from said vessel after 50 minutes and placed in standard glass tubes shall clot within 1 minute of the control time.
d. Aliquots of blood removed from said vessel after 50 minutes and thereupon anticoagulated with citrate, shall yield aliquots of plasma that upon addition of thrombin will clot within 2 seconds of a control, when the control time at 37+ C. is adjusted to 14 seconds by appropriate dilution of thrombin.

The advantages gained by the composition of this invention are compatibility and non-thrombogenicity in contact with mammalian blood, to a degree never before achieved with any substance, combined with the qualities of a separation membrane which may be utilized for oxygenation of blood and dialysis. The processes whereby these compositions are produced have the advantage of relative simplicity compared to the prolonged reaction time and complicated reaction conditions necessary to provide ionic binding sites for those substances in which heparin is ionically bound. These same processes permit achievement of non-thrombogenic biomedical materials in a wide variety of shapes, simple or complicated.

The following examples illustrate the present invention and are not intended to limit the same.

EXAMPLE 1 (HOMOGENEOUS REACTION)

Thirty cc of a 10 weight percent aqueous solution of pure polyvinyl alcohol (less than 0.5 percent polyvinyl acetate) and 4 cc of formalin (37 percent formaldehyde in water) were mixed. Six cc of one normal $H_2SO_4$ were added to the mixture. No heparin was added. The mixture was evacuated to eliminate all air bubbles and placed in between concentric glass tubes. The mixture was sealed and heated at 70° C. for 50 minutes. The resulting polyvinyl alcohol-formal hydrogel was washed extensively with distilled water to extract all acid within 10 minutes and then washed in a physiological dialysate solution for three days. During the course of washing, the hydrogel was squeezed frequently to facilitate the extraction of uncross-linked polymers. This plain hydrogel tubing showed a whole blood clotting time of 40 minutes, from time of venipuncture (Lee-White procedure).

EXAMPLE 2 (HOMOGENEOUS REACTION)

Forty cc of a 10 weight percent aqueous solution of pure polyvinyl alcohol (same as in Example 1) were mixed with 10 cc of formalin. 0.5 gram of solid sodium heparin was dissolved to the mixture. Addition of 3 cc of 0.8N HCl produced in the final solution an acid concentration of about 0.045N. The mixture was evacuated and heated between concentric cylinders to form hydrogel tubing, at 60° C. for 12 hours. The resulting hydrogel-heparin tubing was washed as in Example 1. A piece of tubing, upon staining with toluidine blue, showed uniform brilliant purple, indicating the uniform bonding of heparin. By comparison, control gels containing no heparin do not stain more than temporarily with toluidine blue, and the color is sky-blue rather than purple. The final tubing has a whole blood clotting time of greater than 60 minutes, a thrombin time of 14 seconds and a normal prothrombin time. This hydrogel tubing has a water content of about 96 percent and poor physical strength. Chromatographic data showed that plasma protein leaked out through the hydrogel at a slow rate.

EXAMPLE 3 (HOMOGENEOUS REACTION)

A hydrogel tube was made having exactly the composition of Example 2, except that radioactive heparin containing $S^{35}$ was used. The labelled heparin, bonded on the hydrogel membrane, was counted in a scintillation counter. After one day of washing in water, no appreciable amount of heparin was eluted out from the membrane. The amount of heparin remained constant on the membrane after the second day of washing with water. This firmly bonded heparin did not elute out during a total of 5 days of washing in water, subsequently during 3 days of washing in 0.9 percent saline, and subsequently during 3 days of washing in physiological dialysate solution. That is to say, the $S^{35}$ count on the sample remained constant within experimental error. The heparin remaining in the membrane was estimated to be at least 0.06 percent based on polymer dry weight.

EXAMPLE 4 (HOMOGENEOUS REACTION)

Thirty cc of 10 weight percent aqueous solution of pure (as in Example 1) polyvinyl alcohol and 5 cc of formalin (37 percent formaldehyde) were mixed. Then 0.4 gram of solid sodium heparin was dissolved into the mixture. To the mixture was added 6.2 cc of one normal $H_2SO_4$. The final solution had an acid concentration of 0.15N. The mixture was evacuated to get rid of air bubbles and placed between concentric glass tubes to form tubing. The mixture was heated at 80° C. for 60 minutes. The resulting tubing was washed as in Example 1. The hydrogel tubing contained approximately 94 percent water. A piece of this tubing, upon staining with toluidine blue, showed uniform brilliant purple. Another piece, after shaking in 3M NaCl, again showed uniform brilliant purple. This is in contrast to ionic binding of heparin on aminated polymers from which almost all heparin can be removed after a washing with 3M NaCl for an hour. This hydrogel tubing had whole blood clotting time greater than 60 minutes. The blood which had been incubated in it for 60 minutes when poured into a glass test tube clotted in 6 minutes compared to a control of 7 minutes. Thrombin time on plasma incubated in the hydrogel was 19 seconds versus a control of 13 seconds. These experiments conclusively show negligible elution of heparin upon contact of blood or plasma with hydrogel.

Permeation experiments on the hydrogel tubing (wet wall thickness approximately 3 ½ mm at 23° C.) with whole blood plasma showed 4.6 percent leaking out per 50 hours at 5° C. Since this hydrogel had a large negative expansion coefficient, it swelled to a great extent at 5° C. The actual permeation rate at 37° C. is expected to be lower. Electrophoresis done on the whole blood plasma after the permeation experiment showed no component of any proteins missing. A flat membrane made by reacting the final mixture on a mercury surface had a uniform wet thickness of 79 mils. The effective diffusion coefficient for sodium chloride was measured through this membrane at 37° C., and equalled $1.7 (10)^{-5}$ cm$^2$/sec in comparison with a typical value to that of cuprophane which is $3.5 (10)^{-6}$ cm$^2$/sec.

The products of this composition of hydrogel were tested repeatedly by *in vitro* biomedical tests. Some data are presented as follows:

| Sample | Whole Blood Clotting Time | Glass Time |
| --- | --- | --- |
| II | > 60 min | 6 min (7 min) |
| III | > 60 min | 6 min (7 min) |
| IV | > 80 min | 4 min (5 min) |
| V | > 70 min | 6 min (6 min) |
| VI* | > 100 min | 7 min (6 min) |

Note: The values in parentheses are controls.
*Two blood samples were taken out from the hydrogel glass test. 0.1 cc of protamine was added to one of the samples, resulting in a prolongation of glass time to 8 minutes. The absence of free heparin in the blood is conclusively demonstrated by this test because the protamine in total absence of heparin exhibits characteristic weak anticoagulation.

$S^{35}$ radioactive sodium heparin was used in making one hydrogel tube with the composition described at the beginning of this example. Scintillation counting showed that no free heparin was eluted out after 3 days of washing in isotonic saline. The heparin remaining in the membrane was at least 0.04 weight percent based on the dry weight of the polymer.

EXAMPLE 5 (HOMOGENEOUS REACTION)

Thirty cc of 10 weight percent aqueous solution of pure (as in Example 1) polyvinyl alcohol and 6 cc of formalin (37 percent formaldehyde) were mixed. Then 0.4 gram of sodium heparin was dissolved into it. To the mixture, 2.9 cc of 2.9 cc of 2.0N of $H_2SO_4$ were added to make the final acid concentration about 0.15N. The solution was evacuated and heated between coaxial cylinders at 80° C. for 60 minutes to form a tube. The resulting hydrogel tube was washed as in Example 1. The hydrogel water content was about 93 percent by weight. This tubing had a whole blood clotting time greater than 84 minutes. After incubation in this tube for 84 minutes, blood had a "glass time" of 6 ½ minutes versus a control of 6 minutes.

EXAMPLE 6 (HOMOGENEOUS REACTION)

The composition was exactly as in Example 5, except that 7 cc of formaline and 33 cc of two normal $H_2SO_4$ were used. After evacuation, heating, and washing, as in Example 5, the hydrogel water content was found to be approximately 92 percent by weight. Two samples of tubing of this composition were tested.

| Sample | Whole Blood Clotting Time | Glass Time |
|---|---|---|
| I | 60 min | 4.5 min (4 min) *4.5 min |
| II | 63 min | 8.5 min (6 min) *8.5 min |

Note: The control times are inside parentheses.
* are incubated blood with addition of 0.1 cc of protamine. Normal thrombin and prothrombin times were observed on these tubes.

EXAMPLE 7 (HOMOGENEOUS REACTION)

To a solution containing 0.4 gram sodium heparin in 4 cc of 37 percent formaldehyde, was added 1 cc of 1 percent glutaraldehyde. The above mixture was stirred into another solution containing 25 cc of 8 percent polyvinyl alcohol and 5.8 cc of 1.0N $H_2SO_4$. The total mixture had an acid concentration of about 0.15N. This final solution was evacuated and heated between coaxial cylinders at 80° C. for 45 minutes. The resulting hydrogel after neutralization with dilute sodium bicarbonate solution and washing with saline, was tested repeatedly by in vitro tests. Data are presented as follows:

| Sample | Whole Blood Clotting Time | Thrombin Time (sec) |
|---|---|---|
| I | > 60 min | 14 (14) |
| II | > 60 min | 13 (14) |
| III | > 60 min | 13 (14) |

EXAMPLE 8 (HOMOGENEOUS REACTION)

0.3 gram of sodium heparin was dissolved in 10 cc of 5 weight percent glutaraldehyde aqueous solution. To the mixture, 20 cc of 10 weight percent pure polyvinyl alcohol aqueous solution and 0.3 cc of 20N $H_2SO_4$ were added. The mixture had an acid concentration of about 0.02N. The mixture was evacuated and heated between coaxial cylinders at 90° C. for 1 hour. The resulting hydrogel was washed extensively with distilled water to extract most acid within 10 minutes and then washed in daily-renewed physiological dialysate solutions for 6 days. A piece of this tubing, upon staining with toluidine blue showed uniform brilliant purple. The hydrogel had a water content of about 93 percent.

EXAMPLE 9 (HOMOGENEOUS REACTION)

0.3 gram of sodium heparin was dissolved in 10 cc of 10 weight percent glutaraldehyde aqueous solution. To the mixture, 20 cc of 10 weight percent pure polyvinyl alcohol aqueous solution and 0.2 cc of 2.0N $H_2SO_4$ were added. The mixture had an acid concentration of about 0.013N. The mixture was evacuated and heated between coaxial cylinders at 90° for 100 minutes. The resulting hydrogel was washed as in Example 8. It had a whole blood clotting time greater than 60 minutes and a normal glass time.

EXAMPLE 10 (HOMOGENEOUS REACTION)

The composition was exactly as in Example 9, except that 0.15 cc of 2.0N $H_2SO_4$ was used to make the final acid concentration of about 0.01N. After evacuation, heating at 90° C. for 150 minutes, and washing, as in Example 8, this hydrogel had a whole blood clotting time greater than 60 minutes and a normal glass time.

EXAMPLE 11 (HOMOGENEOUS REACTION)

The composition was exactly as in Example 9, except that 0.1 cc of 2.0N of $H_2SO_4$ was used to make the final acid concentration at about 0.007N. After evacuation, heating at 90° C., for 4 hours, and washing, as in Example 8, this hydrogel had a whole blood clotting time greater than 60 minutes and a normal glass time.

EXAMPLE 12 (HETEROGENEOUS REACTION WITH A CELLULOSIC)

Cellophane dialysis tubing (Union Carbide's No. 8), after extraction of its glycerine by immersion in boiling water, was immersed into an aqueous solution which was composed of 10 cc of 5 weight percent of sodium heparin, 5 cc of 10 weight percent of glutaraldehyde and dilute sulfuric acid to make the final acidity 0.015N. The reaction was carried out inside a closed glass vessel placed in an oven at 90° C. for 90 minutes. After the reaction, the cellulose tubing was washed in a constantly renewed isotonic dialysate solution for 80 hours. The whole blood clotting time (WBCT) of blood drawn by venipuncture into this tubing was greater than 60 minutes. When thereafter poured into a glass tube, the blood clotted in 3 ½ minutes in comparison to a control of 4 ½ minutes. Normal thrombin and partial thromboplastin times were observed on blood incubated in this tubing. Upon staining a piece of the tubing with toluidine blue, it became brilliant purple, characteristic of heparin.

The same reaction was carried out with $S^{35}$-labelled heparin. After washing the reacted cellulose tubing with dialysate solution for 30 hours, the $S^{35}$ heparin was found to be constant at a level of approximately 2 micrograms. The tubing was then washed with 9 wt. % sodium chloride solution for 24 hours. As determined by $S^{35}$ counting of the tubing, no heparin was removed from the cellulose. In contrast, aminoethyl or other aminated cellophane to which heparin is ionically bonded will lose about 99 percent of its heparin upon contact with 9 percent sodium chloride solution for 5 hours.

EXAMPLE 13 (HETEROGENEOUS REACTION WITH A CELLULOSIC)

Cellophane tubing was treated exactly as in Example 12 except that the acidity of the solution was 0.008N and the reaction time was 120 minutes. After washing with dialysate solution, the tubing showed a whole blood clotting time greater than 60 minutes, but normal glass and thrombin times for fresh blood and plasma, respectively, incubating in the tubing.

EXAMPLE 14 (HETEROGENEOUS REACTION WITH A CELLULOSIC)

Cellophane tubing was reacted exactly as in Example 12 except that 10 weight percent of heparin and 15 weight percent of glutaraldehyde solutions were used. After washing, this tubing had a whole blood clotting time greater than 60 minutes, but a normal glass and thrombin time for fresh blood and plasma, respectively, incubated in the tubing.

EXAMPLE 15 (HETEROGENEOUS REACTION WITH A CELLULOSIC)

The interior surface of injection-molded cellulose acetate tubes were first saponified with 1 percent sodium hydroxide at 50° C. for 3 hours. Other conditions of reaction were the same as Example 14. After washing, these tubes, when partially filled with blood drawn by venipuncture, showed whole blood clotting times greater than 60 minutes, but normal glass and thrombin times for fresh blood and plasma, respectively, incubated in the tubes.

EXAMPLE 16 (HETEROGENEOUS REACTION WITH A CELLULOSIC)

Commercially extruded cellulose acetate-butyrate tubing of 7/16 inch in inside diameter, cut into 4 inch lengths and heated-sealed at one end, was first saponified with 5 percent NaOH solution at 60° C. for 24 hours. After washing thoroughly in water to remove free sodium hydroxide, a solution in water of 4 percent by weight heparin and 4 percent by weight glutaraldehyde, acidified with sulfuric acid to a molarity of 0.015M, was placed inside the tubes, with the open ends facing upward. These, in turn, were placed inside a glass vessel sealed at the top, so as to prevent escape of water vapor. The glass vessel was placed inside an air oven at 90° C. for 90 minutes.

Following washing with isotonic saline, these little tubes of cellulose acetate-butyrate were found to have whole blood clotting times in excess of 2 hours, but normal thrombin and partial thromboplastin times for plasma incubated in identically made tubes. Furthermore, whole blood taken by venipuncture, after incubation for 75 minutes in these tubes, clotted within 5 minutes when poured into a glass tube, and within 11 minutes in siliconized glass, like the original controls.

EXAMPLE 17 (HETEROGENEOUS REACTION UTILIZING NETWORK POLYMER HAVING HYDROXYL AND ACETAL GROUPS)

This example illustrates one method for practicing the preferred embodiment of this invention to form an ultrafiltration membrane. A substrate compound was prepared from a homogeneous solution of polyvinyl alcohol (PVA), 6.5 weight percent; formaldehyde, 3.5 weight percent; and sulfuric acid, 0.15N. This solution was coated onto a Schleicher and Schuell No. 595 type quantitative analysis filter. Extensive penetration of the solution was effected. The resulting composition was heated to 70° C. for 60 minutes causing the PVA to gel and become cross-linked. It was permanently mechanically imbedded in the fibrous structure of the filter paper.

A finishing composition was prepared from sodium heparin, 1.0 weight percent; polyvinyl alcohol, 5.5 weight percent; formaldehyde, 7.0 weight percent; and sulfuric acid sufficient to produce a normality of 0.15. The finishing composition was doctored by knife onto the gel-filter paper composition and was heated to 80° C. for 15 minutes. Due to the sulfuric acid present, previously formed acetal bonds in the substrate compound probably revert to secondary hydroxyl groups, because the acid reestablishes the acetal-hemiacetal-hydroxyl equilibrium. Then the reaction probably starts to go forward again, this time involving the simultaneous bonding of heparin and polyvinyl alcohol in the finishing compound to the substrate. After the first 15 minutes, the heparin-containing surface was exposed to glutaraldehyde vapor produced by vaporizing glutaraldehyde out of a 1 percent solution in water at 80° C., thereby producing a very thin "skin" of G-gel. Vapor-phase reaction was effected for 30 minutes and the material was then quenched. The resulting composition comprises a reinforced membrane with a heparinized thin surface, that excludes proteins of blood plasma, bonded to a rather porous interior (the pores being characteristic of a well reacted F-gel), aided and abetted by additional porosity introduced from the filter paper fibers. Typical ultrafiltration rates for this material under 5 lb per square inch of transmembrane pressure are 140 ml. of fluid per minute per square meter when 3 percent albumin in isotonic saline is placed on the high pressure side. Exclusion of albumin is 80 percent or better, and 80 ml of fluid per minute per square meter when citrated blood-bank blood was ultrafiltrated, excluding 95 to 100 percent of all blood proteins.

EXAMPLE 18 (HETEROGENEOUS REACTION UTILIZING NETWORK POLYMER HAVING HYDROXYL AND ACETAL GROUPS)

This example provides another method for practicing the preferred embodiment of this invention to form an ultrafiltration membrane. Two substrate compounds were used (instead of one as in Example 17) and a strong monofilament mesh was used together with analytical grade filter paper to produce a strong tear resistant ultrafiltration membrane. The first substrate compound (impregnating compound) was prepared by dissolving 2 percent by weight polyvinyl alcohol, 20 percent formaldehyde, and sufficient sulfuric acid to produce a normality of 0.3 in water. The filter paper was floated on this substrate compound and immediately imbibed it from the under surface to the upper surface. A second substrate compound, or bonding compound, was prepared by dissolving 5.5 weight percent polyvinyl alcohol, 8.0 weight percent formaldehyde, and sufficient sulfuric acid to produce a normality of 0.15 in water. The second substrate composition was spread on the upper surface of the previously impregnated paper and the reinforcing monofilament mesh screen then was laid thereon so that the second substrate composition filled the interstices of the screen and held it in a matrix which became homogeneous with the filter paper underneath. Reaction was accomplished by heating the assembly at 70° C. for 50 minutes under conditions that prevented loss of water or formaldehyde vapor. The resulting material was essentially a well reacted "F-gel" in which was imbedded on one side the monofilament mesh screen and on the other side the filter paper. The F-gel contained no heparin, however, and it is non-uniform by reason of the use of two different substrate compounds.

This bilayer structure, prepared as described above, was reversed so that the screen was down and the paper side was up. A finishing compound, comprising 1.5 weight percent heparin, 5.5 percent polyvinyl alcohol, and 0.15N sulfuric acid, was applied in two successive coatings, by doctor blade, with partial evaporation in between coatings, so as to produce a uniform, pinhole-free, but nonetheless thin coating on the surface. This finishing coating was gelled and simultaneously bonded to the substrate by heating it to 80° C. for 15 minutes then with glutaraldehyde vapor for 30 minutes.

The resulting membrane has high mechanical strength and consists of a very thin protein-excluding membrane containing the heparin on one surface supported by a paper and monofilament mesh structure plus the polyvinyl alcohol-coacetal gel therein. This membrane is useful in hemodiafiltration (a typical ultrafiltration rate for ACD blood-bank blood is 120 ml per minute per square meter; exclusion of blood proteins is 90 to 95 percent).

EXAMPLE 19 (HETEROGENEOUS REACTION UTILIZING NETWORK POLYMER HAVING HYDROXYL AND ACETAL GROUPS)

This example illustrates a method for obtaining a preferred embodiment of this invention wherein a catheter is produced. A "lifeline" intravenous catheter, intended specifically for long-term support of an infant with sever defect of the alimentary canal, was prepared as follows. A substrate layer from a composition prepared by dissolving 1.9 weight percent polyvinyl alcohol, 22.9 weight percent formaldehyde, and sufficient sulfuric acid to give a normality of 0.3N in water. This composition was cased between coaxial glass cylinders to produce a hollow tube having a lumen diameter of approximately 0.5 mm and an external diameter of approximately 1.0 mm. In this configuration, heating was effected for 150 minutes at 80° C. to cause gelation. The gel was rinsed, and then exposed to drying conditions whereby it is desiccated to a final water content ranging between 15 percent by weight water and 1 percent by weight water. The partially dried F-gel tube then can be slipped off of the inner molding cylinder. The more severe the desiccation, the tougher the final material becomes and the less reswellable it becomes.

After desiccation, the gel was allowed to rehydrate itself to equilibrium by resoaking in water. It was then allowed to undergo a "reversion" process to regenerate hydroxyl groups on the surface, most of which was lost in the formation of cyclic and interchain acetal bonds. The gel was soaked in 1.0N sulfuric acid for 10 hours at 50° C. It was then washed leaving a material with a surface having a significant hydroxyl content capable of further reaction.

A surface composition was prepared by soaking 5.0 wt. percent sodium heparin, 5.0 wt. percent glutaraldehyde, and 0.1N sulfuric acid. The tube was soaked in this finishing compound and then heated for 30 minutes at 80° C. and rinsed. The heparin was covalently bonded to the tubing. The tubing prepared according to this process has a mechanical feel ranging from over-cooked macaroni (no desiccation of the original gel following its reaction) to hard, wiry material in the case of complete desiccation of the gel prior to the reversion process and finishing compound reaction. Optimum properties from the point of view of "lifeline" use are obtained by drying the gel to about 10 weight percent water. This product can sustain 0.6 kg of tensile force without breaking. It is relevant to note that in the desiccation process the lumen and exterior diameter of the tubing decrease enormously.

The process of this example has general applicability in making vascular prostheses, implants of the Hakim type for hydrocephalus, aortic and mitral heart valve flaps, ball-and-cage heart valves, ets.

As many apparently widely different embodiments of this invention may be made without departing from the spirit and scope thereof, it is to be understood that we do not limit ourselves to the specific embodiments thereof except as defined in the appended claims.

We claim:

1. A non-thrombogenic polymeric blood-contacting bimedical device composition shapable in the form of hemodialysis tubing, hemodiafiltration membranes, hollow tube intravenous catheters, vascular prosthesis implants, heart valve and aortic and mitrao heart valve flaps and like devices and prosthesis comprising a heparin-type anticoagulant covalently bonded through an acetal or hemiacetal bridge to a polymer surface or membrane thereof intended to lie in direct contact with blood, said bridges being formed from an aldehyde, hydroxyl groups or hydroxyl and acetal groups of said polymer and hydroxyl groups of said anticoagulant.

2. The composition of claim 1 wherein the anticoagulant is heparin.

3. The composition of claim 1 wherein the anticoagulant is sodium heparin.

4. The composition of claim 1 wherein the aldehyde is formaldehyde.

5. The composition of claim 1 wherein the aldehyde is glutaraldehyde.

6. The composition of claim 1 wherein the polymer comprises polyvinyl alcohol that has undergone previous reaction with an aldehyde and an acid to render it into a cross-linked state.

7. A process for making a non-thrombogenic polymer surface or membrane of a shaped blood-contacting biomedical appliance composition which comprises reacting on said shaped appliance polymer surface or membrane in the presence of an acid catalyst an aldehyde, a heparin-type anticoagulant and hydroxyl groups or combinations of hydroxyl and acetal groups, said hydroxyl and acetal groups being constituents of macromolecules and selected from the group consisting of linear water-soluble polymers, three-dimensional network polymers, and solid or rubbery matter owing its coherence to microcrystalline or other secondary valence forces, said hydroxyl and acetal groups being initially in a local milieu containing at equilibrium 50 percent water as measured in equilibrium with pure water or saline.

8. The process of making a non-thrombogenic composition according to claim 7 wherein the polymer is a hydrogel and the anticoagulant is heparin.

9. The process of making a non-thrombogenic composition according to claim 7 wherein the polymer is a hydrogel and the anticoagulant is sodium heparin.

10. The process of making a non-thrombogenic composition according to claim 7 wherein the polymer is a hydrogel and the aldehyde is formaldehyde.

11. The process of making a non-thrombogenic composition according to claim 7 wherein the polymer is a hydrogel and the aldehyde is glutaraldehyde.

12. The process of making a non-thrombogenic hydrogel according to claim 7 wherein the hydrogel is prepared from polyvinyl alcohol.

13. The process of making a non-thrombogenic composition according to claim 7 wherein the polymer is a solid polymer and the anticoagulant is sodium heparin.

14. The process of making a non-thrombogenic composition according to claim 7 wherein the polymer is a solid polymer and the anticoagulant is heparin.

15. The process of making a non-thrombogenic composition according to claim 7 wherein the polymer is a solid polymer and the aldehyde is glutaraldehyde.

16. The process of making a non-thrombogenic composition according to claim 7 wherein the polymer is a solid polymer and the aldehyde is formaldehyde.

17. The process of making the composition of claim 7 which comprises contacting a polymer membrane or surface of the cross-linked hydrogel forming the base layer with a coating composition comprising an uncross-linked polymer, a heparin type anticoagulant, an aldehyde and an acid catalyst, said acid catalyst being present in sufficient concentrations to establish an acetal-hemiacetal hydroxyl equilibrium on a surface of said base layer and heating said composition to form an outer layer comprising heparin covalently bonded and to covalently bond said outer layer to said base layer.

18. The process of claim 17 wherein the base layer is dried to a water concentration of less than about 15 wt. % prior to contacting the base layer with said composition.

19. The process of claim 18 wherein the dried base layer is contacted with an acid to establish an acetal-hemiacetal-hydroxyl equilibrium prior to contacting the base layer with said composition.

20. The process of claim 17 wherein the base layer contains a reinforcing material and is formed by contacting the reinforcing material with a base composition comprising a polymer an aldehyde and an acid catalyst and heating said base composition to form a crosslinked hydrogel prior to contacting the base layer with said coating composition.

21. The method of making a polymer surface of a shaped blood-contacting biomedical appliance non-thrombogenic comprising the steps of:

selecting a water-insoluble polymeric surface thereof that contains in the immediate vicinity of said surface at least 50 wt. % water when in equilibrium with liquid water or dilute saline solutions at temperatures between 0° C. and 50° C., said polymeric substance having hydroxyl groups attached to the principal molecular chains, preparing an aqueous solution of an aldehyde and a heparin type anticoagulant by mixing until homogenous, adding sufficient acid to said aldehyde and anticoagulant solution, either prior to, concomitantly with, or subsequently to bringing said solution of said aldehyde, and anticoagulant into intimate contact with said polymeric surface, heating said polymeric surface in contact with said solution of aldehyde, anticoagulant, and acid for a period of time between 30 minutes and 10 hours and a temperature between 60° and 90° C.

22. The method of making a non-thrombogenic polymer surface according to claim 21 wherein said anticoagulant is an artificial sulfated anticoagulant polysaccharide.

23. The method of making a non-thrombogenic polymer surface according to claim 22 wherein said anticoagulant is heparinoid.

24. The method of making a non-thrombogenic polymer surface according to claim 22 wherein said anticoagulant is heparin.

25. The method of making a non-thrombogenic polymer surface according to claim 24 wherein said aldehyde is a dialdehyde.

26. The method of making a non-thrombogenic polymer surface according to claim 25 wherein said dialdehyde is glutaral-dehyde.

27. The method of making a non-thrombogenic polymer surface according to claim 26 wherein said acid is sulfuric acid.

28. The method of making a non-thrombogenic polymer surface according to claim 21 wherein said polymer is cross-linked polyvinyl alcohol-co-formal.

29. A non-thrombogenic polymeric blood-contacting biomedical device composition shapable in the form of hemodialysis tubing, hemodiafiltration membranes, hollow tube intravenous catheters, vascular prosthesis implants, heart valve and aortic and mitrao heart valve flaps and like devices and prosthesis comprising a heparin-type anticoagulant covalently bonded through an acetal or hemiacetal bridge to a polymer surface or membrane thereof intended to lie in direct contact with blood selected from the group consisting of a hydrogel, cellulose, cellophane and cellulose ester, said bridges being formed from an aldehyde, hydroxyl groups or hydroxyl and acetal groups of said polymer and hydroxyl groups of said anticoagulant.

30. The composition of claim 29 wherein the anticoagulant is heparin.

31. The composition of claim 29 wherein the anticoagulant is sodium heparin.

32. The composition of claim 29 wherein the aldehyde is formaldehyde.

33. The composition of claim 29 wherein the aldehyde is glutataldehyde.

34. A process for making a non-thrombogenic polymer surface or membrane of a shaped blood-contacting biomedical appliance composition which comprises reacting on said shaped appliance polymer surface or membrane in the presence of an acid catalyst an aldehyde, a heparin-type anticoagulant and hydroxyl groups or combinations of hydroxyl and acetal groups, said hydroxyl and acetal groups being constituents of macromolecules and selected from the group consisting of linear water-soluble polymers, three-dimensional network polymers, and cellulose, cellophane, and cellulose esters, said hydroxyl and acetal groups being initially in a local milieu containing at equilibrium 50 percent water as measured in equilibrium with pure water or saline.

35. The method of making a polymer surface of a shaped blood-contacting biomedical appliance non-thrombogenic comprising the steps of:

selecting a water-insoluble polymeric surface selected from the group consisting of cellulose, cellophane and cellulose esters that contains in the immediate vicinity of said surface at least 50 wt % water when in equilibrium with liquid water or dilute saline solutions at temperatures between 0° and 50° C., said polymeric surface having hydroxyl groups attached to the principal molecular chains, preparing an aqueous solution of an aldehyde and a heparin type anticoagulant by mixing until homogeneous, adding sufficient acid to said aldehyde and anticoagulant solution, either prior to, concomitantly with, or subsequently to bringing said solution of said aldehyde, and anticoagulant into intimate contact with said polymeric surface, heating said polymeric surface in contact with said solution of aldehyde, anticoagulant, and acid for a period of time between 30 min. and 10 hours and a temperature between 60° and 90° C.

36. The method of making a non-thrombogenic polymer surface according to claim 35 wherein said anticoagulant is an artificial sulfated anticoagulant polysaccharide.

37. The method of making a non-thrombogenic polymer surface according to claim 36 wherein said anticoagulant is a heparinoid.

38. The method of making a non-thrombogenic polymer surface according to claim 35 wherein said anticoagulant is heparin.

39. The method of making a non-thrombogenic polymer surface according to claim 38 wherein said aldehyde is a dialdehyde.

40. The method of making a non-thrombogenic polymer surface according to claim 39 wherein said dialdehyde is glutaraldehyde.

41. The method of making a non-thrombogenic polymer surface according to claim 40 wherein said acid is sulfuric acid.

42. The process of making a non-thrombogenic composition according to claim 34 wherein the polymer is a hydrogel and the anticoagulant is heparin.

43. The process of making a non-thrombogenic composition according to claim 34 wherein the polymer is a hydrogel and the anticoagulant is sodium heparin.

44. The process of making a non-thrombogenic composition according to claim 34 wherein the polymer is a hydrogel and the aldehyde is formaldehyde.

45. The process of making a non-thrombogenic composition according to claim 34 wherein the polymer is a hydrogel and the aldehyde is glutaraldehyde.

46. The process of making a non-thrombogenic hydrogel according to claim 34 wherein the hydrogel is prepared from polyvinyl alcohol.

47. The composition of claim 29 wherein the polymer comprises a copolymer of vinyl alcohol and vinyl acetate originally in aqueous solution.

48. The composition of claim 29 wherein the polymer is an incompletely substituted cellulose ester.

49. The process of making a non-thrombogenic composition according to claim 34 wherein the polymer is cellulose or cellophane.

50. The process of making a non-thrombogenic composition according to claim 34 wherein the polymer is an incompletely substituted cellulose ester.

51. A multilayer polymeric composition comprising an outer layer comprising the composition of claim 29 covalently bonded to a base shaped blood-contacting biomedical appliance polymer surface or membrane layer comprising a hydrogel cross-linked with an aldehyde.

52. The composition of claim 51 wherein the aldehyde in the outer layer is formaldehyde.

53. The composition of claim 51 wherein the aldehyde in the outer layer is formaldehyde and glutaraldehyde.

54. The composition of claim 51 wherein the base layer is crosslinked with formaldehyde.

55. The composition of claim 51 wherein the base layer contains a fibrous reinforcing material.

56. The method of making a non-thrombogenic polymer surface according to claim 35 wherein said polymer is cellulose or cellophane, said anticoagulant is heparin, and said aldehyde is glutaraldehyde.

57. The method of making a non-thrombogenic polymer surface according to claim 35 wherein said polymer is an incompletely substituted cellulose ester.

58. The method of making a non-thrombogenic polymer surface according to claim 35 wherein said polymer is partially de-esterified cellulose acetate.

59. The method of making a non-thrombogenic polymer surface according to claim 35 wherein said polymer is partially de-esterified cellulose acetate butyrate.

60. The method of making a non-thrombogenic polymer surface according to claim 35 wherein said polymer is partially de-esterified cellulose propionate-butyrate.

61. The method of making a non-thrombogenic polymer surface according to claim 59 wherein said partially de-esterified polymer is produced by saponifying a surface of cellulose acetate butyrate by maintaining said cellulose acetate butyrate in a 5% NaOH solution at 60° C. for approximately 24 hours.

62. An implantable or extracorporeal biomedical blood-contacting shaped appliance shaped in the form of hemodialysis tubing, hemodiafiltration membranes, hollow tube intravenous catheters, vascular prosthesis implants, heart valve and aortic and mitrao heart valve flaps and like devices and prosthesis article with non-thrombogenic polymeric surfaces prepared according to claim 41 wherein said polymer is a cellophane membrane.

63. An implantable or extracorporeal biomedical blood-contacting shaped appliance shaped in the form of hemodialysis tubing, hemodiafiltration membranes, hollow tube intravenous catheters, vascular prosthesis implants, heart valve and aortic and mitrao heart valve flaps and like devices and prosthesis article with non-thrombogenic polymeric surfaces prepared according to claim 41 wherein said polymer is a cellulose ester.

64. An implantable or extraporeal biomedical blood-contacting shaped appliance shaped in the form of hemodialysis tubing, hemodiafiltration membranes, hollow tube intravenous catheters, vascular prosthesis implants, heart valve and aortic and mitrao heart valve flaps and the like devices and prosthesis article with non-thrombogenic polymeric surfaces prepared according to claim 41 wherein said polymer is rigid cellulose acetate butyrate.

* * * * *